Dec. 15, 1925.
A. R. WILLARD
1,565,347
APPARATUS FOR FILLING STORAGE BATTERY CELLS WITH ELECTROLYTE
Filed Dec. 7, 1921    2 Sheets-Sheet 1
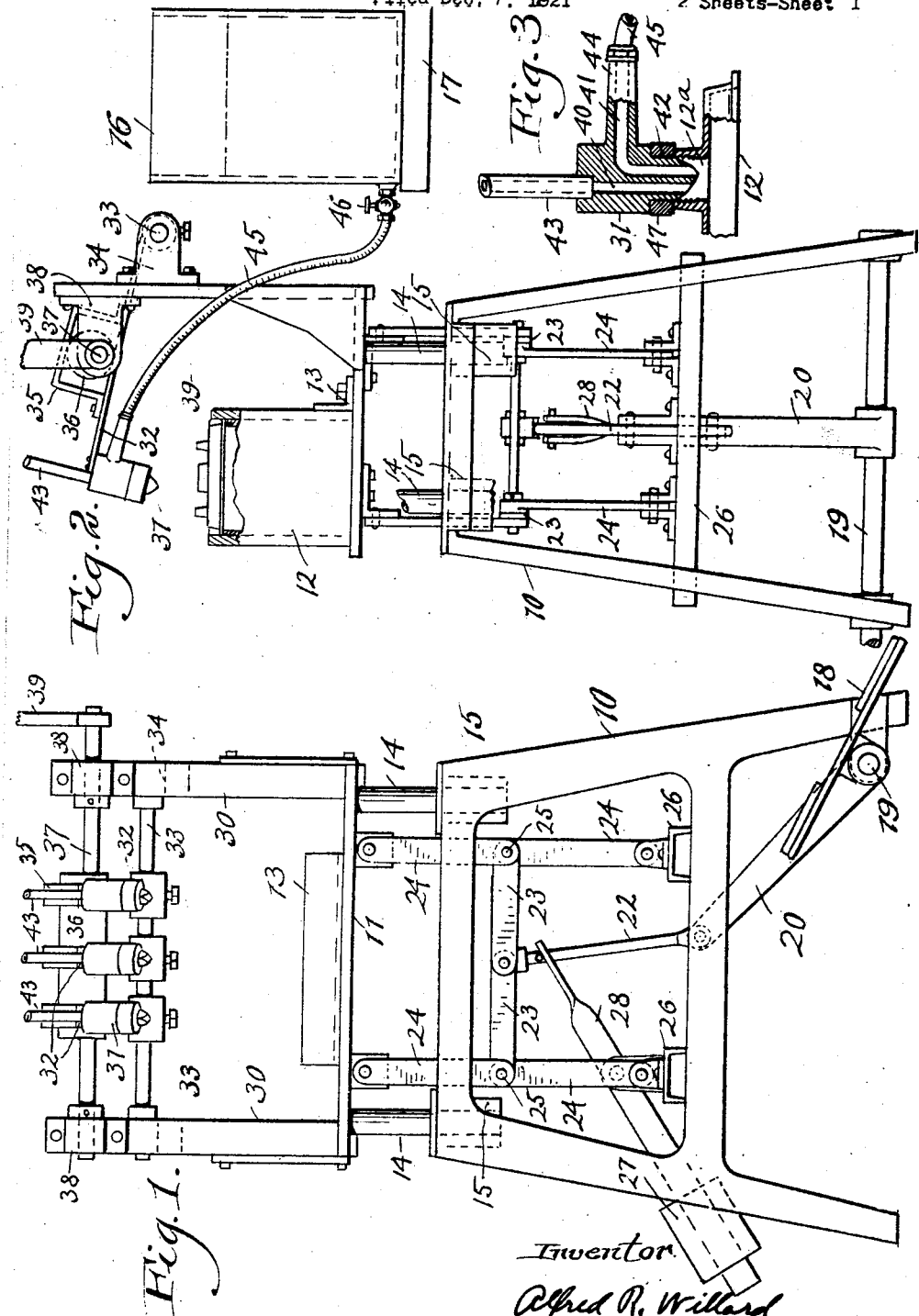
Inventor
Alfred R. Willard

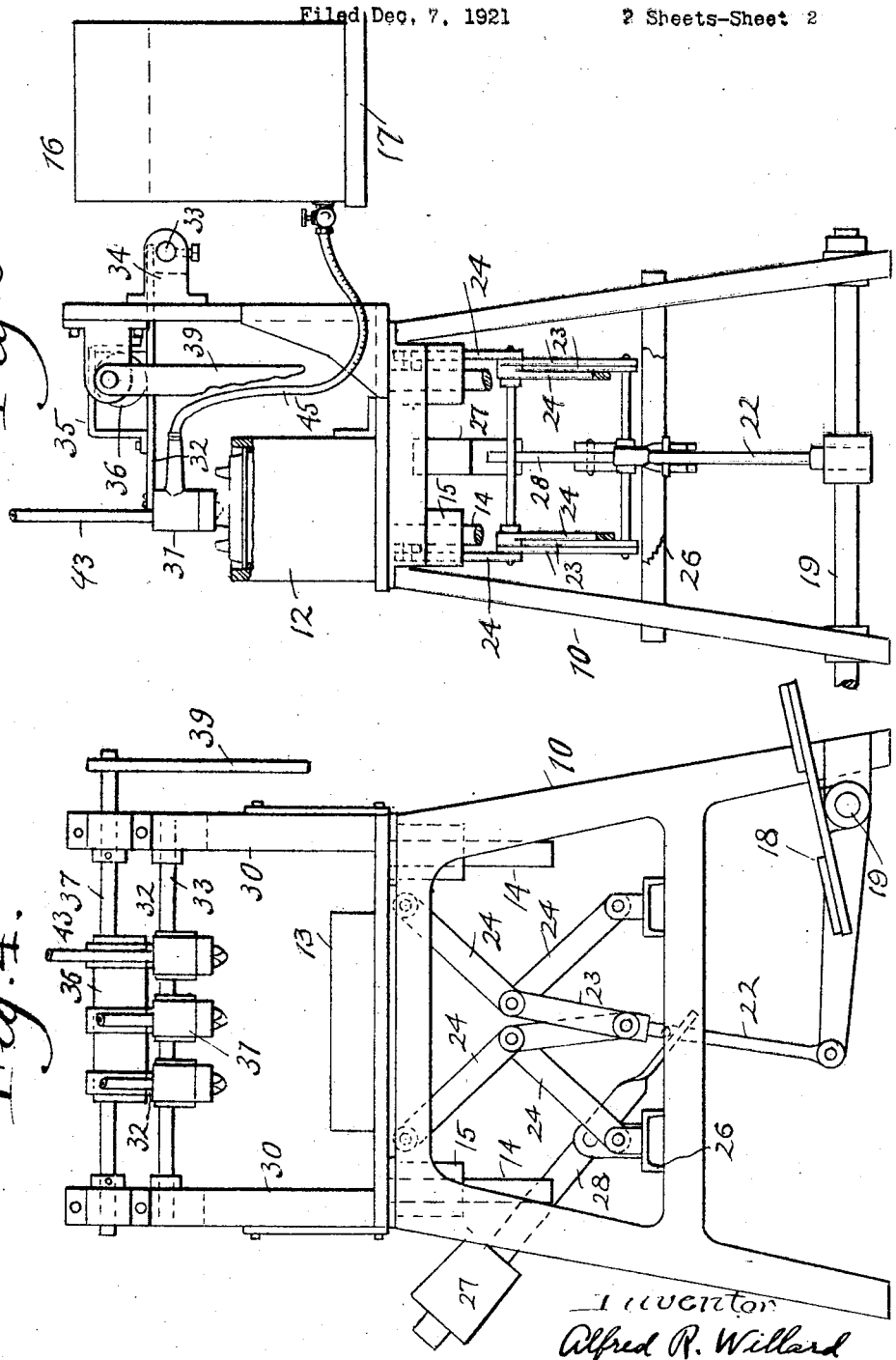

Patented Dec. 15, 1925.

1,565,347

UNITED STATES PATENT OFFICE.

ALFRED R. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

APPARATUS FOR FILLING STORAGE-BATTERY CELLS WITH ELECTROLYTE.

Application filed December 7, 1921. Serial No. 520,553.

*To all whom it may concern:*

Be it known that I, ALFRED R. WILLARD, a citizen of the United States, residing at East Cleveland, in the county of Cuyahoga and State of Ohio, have invented a certain new and useful Improvement in Apparatus for Filling Storage-Battery Cells with Electrolyte, of which the following is a full, clear, and exact description.

This invention relates to an apparatus and a method for filling storage battery cells with electrolyte, and has for its chief object to provide certain improvements which enable the cells to be filled effectively and uniformly to the desired amount.

Heretofore it has been customary to fill the cells with a tube, and the electrolyte was allowed to run through the tube into a cell until the cell was full, whereupon the filling would be discontinued. This usually resulted in some of the electrolyte being spilled over the top of the cell, and also as the cell contains battery elements and separators which are porous, with this method of filling it has been necessary to refill the cells to replace the electrolyte that has been absorbed.

Other devices and apparatus have been proposed and used to some extent, but as far as I am aware they can only fill cells to the top, or to a point near the top, and would require a second filling or refilling to take care of absorption.

By the present invention which permits either one or a plurality of cells, or a battery containing any number of cells to be filled with electrolyte at the same time, tight connections are made between a filler and each cell, which allows for filling to an amount greater than the capacity of the cell so as to provide for absorption, the excess rising into the nozzle or vent tube of the nozzle without resulting in any spillage. Secondly, after the absorption has taken place, by a relative movement between the cell or cells and the container from which the electrolyte is supplied, the excess liquid over that actually required to fill the cell to the desired level is automatically returned to the receptacle.

In the accompanying sheets of drawings, Fig. 1 is an elevation of the filling machine or apparatus embodying my invention in one of its forms; Fig. 2 is a similar view, viewing the same from a position at right angles to that shown in Fig. 1, both Figs. 1 and 2 showing the parts in position for loading the cells before filling. Fig. 3 is a detail sectional view showing a portion of the cell cover and showing the filling nozzle; and Figs. 4 and 5 are views similar to Figs. 1 and 2, showing the nozzles lowered onto the vent openings of the cells of a battery, and showing the battery lowered to filling position.

Referring now to the drawings, in the embodiment of the invention herein illustrated, the machine includes a stationary frame 10, and a vertically movable platform 11, on which the cells 12 which may be arranged and secured in a battery box or in the form of a battery as here shown, are adapted to be placed, the platform having an abutment 13 against which the battery box is placed to properly position the cells for filling.

The platform has four round guide rods 14 depending therefrom, and these guide rods pass through vertically disposed sockets in bearings 15 in the form of bosses at the four corners of the top of the frame 10.

As will be subsequently explained, the platform is in the position shown in Fig. 1 before the filling operation, and when the battery or the cells are placed on the platform for filling purposes, and are lowered to the position shown in Figs. 4 and 5 in order that the electrolyte might flow by gravity from the tank or receptacle 16 mounted on any suitable support 17 adjacent the stand or frame 10. It might be here stated that it is desirable that the liquid be maintained at a constant level in the receptacle 16, and any suitable means, not shown, may be provided for this purpose, such as a float-controlled valve.

Any suitable means may be provided for the purpose of raising and lowering the platform so as to lower the cells or battery from loading position to filling position, so that the cells may be filled with the proper amount of electrolyte, and raising the cells back again to filling position where the excess liquid drains by gravity back into the receptacle. In this instance the following mechanism has been provided for this purpose. At the bottom of the frame a foot pedal 18 is provided, fixed to a rock shaft 19 which is journaled in bearings in the lower part of two of the legs of the frame 10, this pedal being preferably secured to that portion of the shaft which projects beyond the frame. Between the ends of the shaft and substantially centrally of the frame, this shaft has secured to it an arm 20 which is connected by an upwardly extending link 22 to a pair of links 23, which have their inner ends pivotally connected together and their outer ends connected each to a pair of arms or links 24, whose inner ends are pivotally connected together at 25. The upper ends of the upper links 24 are pivotally connected to the lower part of the platform, and the lower ends of the lower links 24 are pivotally connected to horizontal members 26, here shown in the form of channels extending across the frame 10 to midway between the top and bottom thereof. A pivoted counterweight 27 is supported on one of the cross members 26, and the inner end of the arm 28 carrying the counterweight bears against a pin 29 on the link 22, as clearly shown in Fig. 1, the function of the counterweight being to counterbalance the weight of the platform.

When the platform is in elevated position, the links 23 are in alignment and are horizontal, and the two pairs of links 24 are in alignment and are vertical. With the pairs of links in alignment as shown, they act as toggles and the platform is held in its upper position. On the other hand, when the platform 11 is lowered to the position shown in Fig. 3 by rocking the foot pedal 18, the various links of the platform shifting mechanism assume the position shown in Fig. 4, in which event the connecting point of the links 23 is pulled downward and the two pairs of links 24 previously vertical are broken inward. The weight of the cells or battery placed on the platform, added to the weight of the platform causes the platform now to remain in its lowered position until the foot pedal is again rocked to restore the platform to elevated position. The counterweight renders it easy for the operator to restore the parts to elevated position.

The platform is provided at the back with a pair of upstanding arms 30 which support a plurality of filling nozzles 31, the number of which depends upon the number of cells to be filled simultaneously. In some instances it may be desirable to fill a single cell at a time, in which event the machine need be provided with one nozzle only, or it may be desirable to fill a plurality of cells at one time, in which event the machine will have a plurality of nozzles equal to the maximum number of cells to be filled at one time.

These nozzles are movably supported so that they may be raised and lowered with respect to the cells being filled or to be filled, and while this may be done in different ways, in this instance the nozzles are carried by arms 32 which extend back beyond the upright arms 30 on the platform, and at their rear ends are secured to a shaft 33 supported in bearings 34 provided on the rear ends of the arms 30. To raise and lower the nozzles the arms 32 are swung about the axis of the shaft 33, and for this purpose the arms are provided with yokes 35 through which extends an eccentric 36 on a shaft 37 supported in bearings 38 on the upper front part of the arms 30. A hand lever 39 is secured to one end of the shaft 37 for the purpose of turning the shaft so as to rotate the eccentrics through about one-half revolution to bring the nozzles 31 downward into contact with the top of the filling openings of the cells, or to move them away from the cells. The arms 32 preferably have a certain degree of flexibility so as to automatically compensate for slight irregularity in the heights of the cells.

Considering now the nozzles 31 and the connections between the nozzles and the receptacle 16, it will be observed particularly by reference to Fig. 3, that each nozzle is provided with two passageways 40 and 41, both of which extend up from a reduced neck 42, which neck, or a portion thereof is adapted to be extended down into the vent hole $12^a$ of the cell, that is, down into the upstanding flange on the cell cover, which flange is normally adapted to receive the vent plug. The opening 40 which extends up through the body of the nozzle is the air passageway or vent. This passage is preferably extended up through a glass or other transparent vent or breather tube 43 secured in the top of the body of the nozzle in line with the straight passageway 40. The other passageway 41, which is the passageway through which the electrolyte is supplied, extends upwardly and then laterally through an extension 44 of the nozzle. To the end of this extension is secured a flexible tube 45 which may be of rubber, which tube is connected to the lower part of the receptacle 16. As shown in Fig. 2, a valve 46 may be provided for the purpose of controlling the flow of electrolyte from the receptacle to the tube.

Around the neck 42 of the nozzle a yieldable gasket 47, which may be of rubber, is provided, so that when the nozzles are lowered down onto the cells a tight connection will be made between the nozzles and the tops of the cells so that leakage is entirely avoided at this point. By varying the thickness of the washer 47, the lower end of the nozzle neck may be extended different distances into the opening $12^a$ of the cell. This makes it possible to fill the battery to any desired height, as will be subsequently explained.

In the use of this apparatus a battery is placed on the platform, containing any desired number of cells, the platform then being in elevated position as shown in Figs. 1 and 2, and the nozzles also being elevated at this time. The operator then swings the hand lever 39, and this movement of the lever simultaneously swings the nozzles down into the filling openings of the different cells of the battery, making tight seals between the nozzles and the cells. Thereupon the operator rocks the foot pedal 18, causing the platform, battery and nozzles to be lowered to the position shown in Figs. 4 and 5. In doing this the passageways 41 of the nozzles are brought below the level of the liquid in the receptacle 16, and immediately the electrolyte flows into and fills the cells, and the passage of the electrolyte to the cells continues until the electrolyte rises in the breather tubes 43 to the level of the electrolyte of the receptacle. In other words, the cell has been more than filled, but there has been no flowing of the electrolyte over the cells, the excess being retained in the nozzles and breather tubes.

The parts are permitted to remain in this position for a predetermined time, or until the major portion of the absorption has taken place. This is shown by the rising of bubbles up into the breather tube. However, as the liquid in the cells is displaced during the absorption process by forcing out the air, more liquid runs from the receptacle into the cells, so that there is always sufficient liquid supplied to take care of the absorption.

After the predetermined interval of time has elapsed during which the major portion of the absorption has taken place, the operator again rocks the foot pedal causing the platform, battery and nozzles to be elevated. In so doing, the outlet passageways 41 are brought above the level of the liquid in the receptacle, whereupon the excess liquid drains back into the receptacle, leaving the battery filled to a height determined by the length of the nozzles, or to the location of the lower ends of the vent passageways 40. The lower ends of these passageways may terminate in the flange surrounding the filling openings, as shown in Fig. 3, in which event the cells will be filled well up into the flanges so as to supply enough to take care of the small amount of absorption which may take place slowly, subsequent to the filling operation just described, or if desired, by extending the necks of the nozzles further down into the cells, the draining back into the receptacle may continue until there is a less amount of electrolyte left in the cell. In any event, after this draining back into the receptacle has taken place, the electrolyte is left at a predetermined level in the cell, and this level is the same for all the cells.

This fills all cells uniformly to the desired level and permits a uniform action in the charging and forming of the cells. Furthermore, the filling operation is done quickly, though ample time is allowed for absorption. Additionally there is no spilling of the electrolyte over the cells, this being a very important consideration in view of the fact that the electrolyte consists of an acid which if allowed to run over the cells and on the battery box, may damage the latter and mar its appearance.

The operator next elevates the nozzles, removes the battery from the platform, places another battery thereon, and the operation is then repeated.

I do not desire to be confined to the exact details or exact arrangements shown, for various changes may be made in the construction without deviating from the invention which I am aiming to cover in a broad sense. For example, the mechanism for raising and lowering the platform may be other than here shown, the specific mechanism illustrated being employed for the purpose of illustrating one of numerous mechanisms which may be employed for this purpose. Furthermore, I do not desire to be confined to an apparatus wherein the platform and battery are raised and lowered with respect to the receptacle, for in some instances it may be desired to obtain the necessary relative movement between the battery and receptacle in a different way, as by raising and lowering the receptacle. I prefer, however, that the relative movement be obtained by raising and lowering the platform and the battery placed on it. Other changes may be made without departing from the invention.

Having described my invention, I claim:

1. In an apparatus for filling battery cells with electrolyte, means for supporting the cells to be filled comprising a frame and a vertically movable cell support on the frame adapted to hold the cells in upright position during vertical movement, a receptacle adapted to contain the electrolyte, a filling nozzle connected to said receptacle, a nozzle supporting member carried by said support and movable vertically with respect thereto, means for moving the nozzle down onto a cell so as to make a tight connection therewith, and means for lowering the support to a position in which the electrolyte will pass by gravity from the receptacle to the cell, and for raising the support to a position in which the excess electrolyte will drain back into the receptacle, said nozzle having a passageway for the flow of the electrolyte and a passageway for the escape of air, with provision whereby a quantity of electrolyte may be received and retained by the nozzle during the filling operation in excess of that required to fill the cell.

2. In an apparatus for filling battery cells with electrolyte, means for supporting the cells to be filled, comprising a frame and a vertically movable battery supporting platform on the frame adapted to hold the cells in upright position during vertical movement, a receptacle adapted to contain the electrolyte, filling nozzles connected to said receptacle said nozzles each having a passageway for the flow of electrolyte and a passageway for the escape of air with provision whereby a quantity of electrolyte may be received and retained by the nozzles during the filling operation in excess of that required to fill a cell, means carried by the platform for holding the nozzles in alignment with the openings of the cells of a battery on the platform and for clamping the nozzles to said openings, and means for lowering the platform to a position in which the electrolyte flows by gravity from the receptacle to the cells and for raising the same to a position in which the excess electrolyte will drain back into the receptacle.

3. In an apparatus for filling battery cells with electrolyte, means for supporting the cells to be filled comprising a frame, a vertically movable battery supporting platform on the frame, means for guiding the platform and for holding the same against tilting movement and toggles connected to the frame and platform for adjustably supporting the platform, a receptacle adapted to contain the electrolyte, filling nozzles connected to said receptacle, said nozzles each having a passageway for the flow of electrolyte and a passageway for the escape of air with provision whereby a quantity of electrolyte may be received and retained by the nozzle during the filling operation in excess of that required to fill a cell, means carried by the platform for clamping the nozzles to the openings of the cells of a battery on the platform, means connected to said toggles for operating the same to lower the platform to a position in which the electrolyte flows by gravity from the receptacle to the cells and for operating the toggles to raise the platform to a position in which the excess electrolyte will be drawn back into the receptacle.

In testimony whereof, I hereunto affix my signature.

ALFRED R. WILLARD.